US009772889B2

(12) United States Patent  
Lu et al.

(10) Patent No.: US 9,772,889 B2
(45) Date of Patent: *Sep. 26, 2017

(54) EXPEDITED PROCESSING AND HANDLING OF EVENTS

(71) Applicant: Famous Industries, Inc., San Francisco, CA (US)

(72) Inventors: Mark H. Lu, Berkeley, CA (US); Steven E. Newcomb, Berkeley, CA (US); Brian R. Maissey, Berkeley, CA (US); Andrew J. L. de Andrade, San Francisco, CA (US)

(73) Assignee: Famous Industries, Inc., San Francisco, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/329,860

(22) Filed: Jul. 11, 2014

(65) Prior Publication Data

US 2014/0325530 A1 Oct. 30, 2014

Related U.S. Application Data

(63) Continuation-in-part of application No. 14/054,570, filed on Oct. 15, 2013.

(60) Provisional application No. 61/714,130, filed on Oct. 15, 2012.

(51) Int. Cl.
*G06F 15/16* (2006.01)
*G06F 9/54* (2006.01)

(52) U.S. Cl.
CPC ........ *G06F 9/542* (2013.01); *G06F 2209/545* (2013.01)

(58) Field of Classification Search
CPC ............ G06F 17/2247; G06F 17/30905; G06F 17/30896; G06F 17/30893; G06F 9/542; G06F 2209/545
USPC ........................................................ 715/234
See application file for complete search history.

(56) References Cited

U.S. PATENT DOCUMENTS

| 6,731,314 | B1 | 5/2004 | Cheng et al. | |
|---|---|---|---|---|
| 6,922,724 | B1 * | 7/2005 | Freeman | G06F 9/505 |
| | | | | 709/223 |
| 7,069,507 | B1 * | 6/2006 | Alcazar | G06F 9/542 |
| | | | | 715/202 |
| 7,152,210 | B1 | 12/2006 | Van Den Hoven et al. | |

(Continued)

FOREIGN PATENT DOCUMENTS

| WO | 0129702 A2 | 4/2001 | |
|---|---|---|---|
| WO | 03081458 A1 | 10/2003 | |
| WO | WO 2011063561 A1 * | 6/2011 | ........ G06F 17/30896 |

OTHER PUBLICATIONS

International Search Report and Written Opinion for PCT/US2013/065124, mailed Mar. 10, 2014 (18 pages).

*Primary Examiner* — Kyle Stork
*Assistant Examiner* — Hassan Mrabi
(74) *Attorney, Agent, or Firm* — Patent Law Works LLP

(57) ABSTRACT

Various implementations for expedited processing and handling of events are described. A first event associated with a set of one or more surfaces rendered for display in a multi-dimensional space is detected. The first event is routed to a first set of one or more event processors for processing. The first event is processed using the first set of one or more event processors and after the processing, the first event is handled using one or more first event handlers.

26 Claims, 9 Drawing Sheets

(56) References Cited

U.S. PATENT DOCUMENTS

| | | |
|---|---|---|
| 7,469,381 B2 | 12/2008 | Ording |
| 7,479,949 B2 | 1/2009 | Jobs et al. |
| 7,786,975 B2 | 8/2010 | Ording et al. |
| 8,701,032 B1 | 4/2014 | Zhai et al. |
| 8,752,183 B1* | 6/2014 | Heiderich ............ G06F 21/577 |
| | | 726/22 |
| 9,323,503 B1 | 4/2016 | Fontes et al. |
| 2001/0001879 A1 | 5/2001 | Kubik et al. |
| 2002/0036618 A1 | 3/2002 | Wakai et al. |
| 2002/0194388 A1* | 12/2002 | Boloker .................. G06F 8/38 |
| | | 719/310 |
| 2003/0063073 A1 | 4/2003 | Geaghan et al. |
| 2003/0101235 A1* | 5/2003 | Zhang .................... H04L 51/04 |
| | | 709/218 |
| 2004/0194115 A1* | 9/2004 | Mogilevsky ............ G06F 9/542 |
| | | 719/318 |
| 2004/0230903 A1* | 11/2004 | Elza .................... G06F 17/2241 |
| | | 715/234 |
| 2004/0261083 A1* | 12/2004 | Alcazar .................. G06F 9/542 |
| | | 719/318 |
| 2005/0012723 A1 | 1/2005 | Pallakoff |
| 2005/0022211 A1* | 1/2005 | Veselov ................ G06F 9/542 |
| | | 719/318 |
| 2006/0010400 A1 | 1/2006 | Dehlin et al. |
| 2006/0080604 A1 | 4/2006 | Anderson |
| 2006/0101354 A1 | 5/2006 | Hashimoto et al. |
| 2006/0218511 A1* | 9/2006 | Kapoor ................ G06F 17/212 |
| | | 715/854 |
| 2007/0110083 A1* | 5/2007 | Krishnamoorthy ..... H04L 12/66 |
| | | 370/401 |
| 2007/0250823 A1* | 10/2007 | Kono .................. G06F 17/2247 |
| | | 717/143 |
| 2008/0098296 A1 | 4/2008 | Brichford et al. |
| 2008/0126944 A1* | 5/2008 | Curtis ............... G06F 17/30896 |
| | | 715/733 |
| 2008/0168384 A1 | 7/2008 | Platzer et al. |
| 2008/0209442 A1* | 8/2008 | Setlur ................ H04M 1/0222 |
| | | 719/318 |
| 2009/0106775 A1* | 4/2009 | Cermak ............. G06F 17/2247 |
| | | 719/318 |
| 2009/0210819 A1 | 8/2009 | Fujimoto et al. |
| 2010/0197395 A1 | 8/2010 | Geiss |
| 2010/0229186 A1* | 9/2010 | Sathish ................... G06F 9/545 |
| | | 719/318 |
| 2010/0325575 A1 | 12/2010 | Platzer et al. |
| 2011/0164029 A1 | 7/2011 | King et al. |
| 2011/0196864 A1 | 8/2011 | Mason et al. |
| 2011/0202847 A1 | 8/2011 | Dimitrov |
| 2011/0261083 A1 | 10/2011 | Wilson |
| 2011/0264787 A1* | 10/2011 | Mickens ............. G06F 11/3414 |
| | | 709/224 |
| 2012/0013619 A1 | 1/2012 | Brath |
| 2012/0017147 A1 | 1/2012 | Mark |
| 2012/0062604 A1 | 3/2012 | Lobo et al. |
| 2012/0137233 A1* | 5/2012 | Lewontin .......... G06F 17/30905 |
| | | 715/760 |
| 2012/0173977 A1 | 7/2012 | Walker et al. |
| 2012/0174121 A1* | 7/2012 | Treat ....................... G06F 9/542 |
| | | 719/318 |
| 2012/0191993 A1 | 7/2012 | Drader et al. |
| 2012/0268364 A1 | 10/2012 | Minnen |
| 2013/0086516 A1 | 4/2013 | Rodgers |
| 2013/0132818 A1 | 5/2013 | Anders et al. |
| 2013/0132895 A1 | 5/2013 | Németh et al. |
| 2013/0141375 A1 | 6/2013 | Ludwig et al. |
| 2013/0159893 A1 | 6/2013 | Lewin et al. |
| 2013/0176308 A1 | 7/2013 | Mueller |
| 2013/0218721 A1 | 8/2013 | Borhan et al. |
| 2013/0266292 A1* | 10/2013 | Sandrew ................. H04N 9/79 |
| | | 386/282 |
| 2013/0326430 A1* | 12/2013 | Devi ..................... G06F 3/0488 |
| | | 715/863 |
| 2013/0346851 A1 | 12/2013 | Leece |
| 2014/0157209 A1 | 6/2014 | Dalal et al. |
| 2014/0250360 A1* | 9/2014 | Jiang .................. G06F 17/2288 |
| | | 715/229 |
| 2014/0289867 A1 | 9/2014 | Bukai |
| 2014/0317577 A1 | 10/2014 | Chen et al. |
| 2014/0354540 A1 | 12/2014 | Barazi |
| 2015/0029092 A1 | 1/2015 | Holz et al. |
| 2015/0073907 A1 | 3/2015 | Purves et al. |
| 2015/0091790 A1 | 4/2015 | Forutanpour et al. |
| 2015/0205474 A1 | 7/2015 | Donelan |
| 2015/0243324 A1* | 8/2015 | Sandrew ............. G11B 27/031 |
| | | 386/278 |
| 2015/0277569 A1 | 10/2015 | Sprenger et al. |
| 2015/0371023 A1 | 12/2015 | Chen et al. |

* cited by examiner

EXPEDITED PROCESSING AND HANDLING OF EVENTS

CROSS-REFERENCE TO RELATED APPLICATIONS

This application is a continuation-in-part of U.S. patent application Ser. No. 14/054,570, entitled "Efficient Manipulation of Surfaces in Multi-Dimensional Space Using Energy Agents" filed Oct. 15, 2013, which claims the benefit under 35 U.S.C. §119(e) of U.S. Provisional Patent Application No. 61/714,130, entitled "User Input Conversion System Using Vector Agents for Rendering Images" filed Oct. 15, 2012, the entire contents of each of which are incorporated herein by reference.

BACKGROUND

The present disclosure relates to expedited processing and handling of events.

The DOM, as defined by the World Wide Web Consortium (W3C), includes an event model for managing event flow including registering event listeners for various event targets that listen for and handle certain event types. However, the DOM event model requires working through an entire path of a document tree from the document object to the relevant target node, or vice versa, each time an event is received, including intervening segments that are unrelated to the event, which can take additional time and introduce lag into the processing and handling of the event.

SUMMARY

The technology described in this disclosure cures the deficiencies described above in the background section by, for example, expediting the processing and handling of the events. According to one innovative aspect of the subject matter described in this disclosure, a system includes one or more processors and one or more memories storing instructions that, when executed by the one or more processors, cause the system to, detect a first event associated with a set of one or more surfaces rendered for display in a multi-dimensional space, route the first event to a first set of one or more event processors for processing, process the first event using the first set of one or more event processors, and handle the first event using one or more first event handlers after the processing.

In general, another innovative aspect of the subject matter described in this disclosure may be embodied in methods that include detecting, using one or more computing devices, a first event associated with a set of one or more surfaces rendered for display in a multi-dimensional space; routing, using the one or more computing devices, the first event to a first set of one or more event processors for processing; processing the first event using the one or more computing devices and the first set of one or more event processors; and after the processing, handling the first event using the one or more computing devices and one or more first event handlers.

Other implementations of one or more of these aspects include corresponding systems, apparatus, and computer programs, configured to perform the actions of the methods, encoded on computer storage devices.

These and other implementations may each optionally include one or more of the following features, such as that routing the first event to the first set of one or more event processors includes determining, using the one or more computing devices, event characteristics describing the first event, determining, using the one or more computing devices, a route for the first event based on the event characteristics, and routing, using the one or more computing devices, the first event to the first set of one or more event processors using the route; that the route bypasses a standard path defined by a document object model for event processing; that processing the first event includes processing event data associated with the first event to interpret an objective associated with an input provided by a user, the input triggering the first event associated with the one or more surfaces of the set; after the processing by first set of one or more event processors, determining, using the one or more computing devices, whether further processing is required for the first event; responsive to determining that the further processing is required, routing, using the one or more computing devices, the first event to a second set of one or more event processors for the further processing; that handling the first event includes determining, using the one or more computing devices, one or more physics parameters for the first event and translating, using the one or more computing devices, the one or more surfaces of the set associated with the first event based on the one or more physics parameters; detecting, using the one or more computing devices, a second event associated with the set of one or more surfaces rendered for display in the multi-dimensional space; determining, using the one or more computing devices, the second event to meet a predetermined processing criterion; handling the second event using the one or more computing devices and one or more second event handlers without previously processing the second event using event processors; rendering, using the one or more computing devices, one or more visual effects in relation to the one or more surfaces of the set based on the handling; that the first event includes one of a touch event, a mouse pointer event, a keyboard event, and a motion gesture event; and that the one or more surfaces correspond to one or more DOM elements that are rendered for display via a web browser.

These implementations are particularly advantageous in a number of respects. For instance, the technology described can reduce and/or eliminate unwanted artifacts that surface during routine event flow management by the DOM, such as input lag (a discernible period of time between the time a user input was provided and handled by the DOM). The technology described herein can further bypass unnecessary processing for an event or terminate the event in early phases of the standard event processing procedure or flow defined by the current DOM event model. This is further advantageous as it saves additional time and computing resources that are utilized in the standard event processing procedure. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
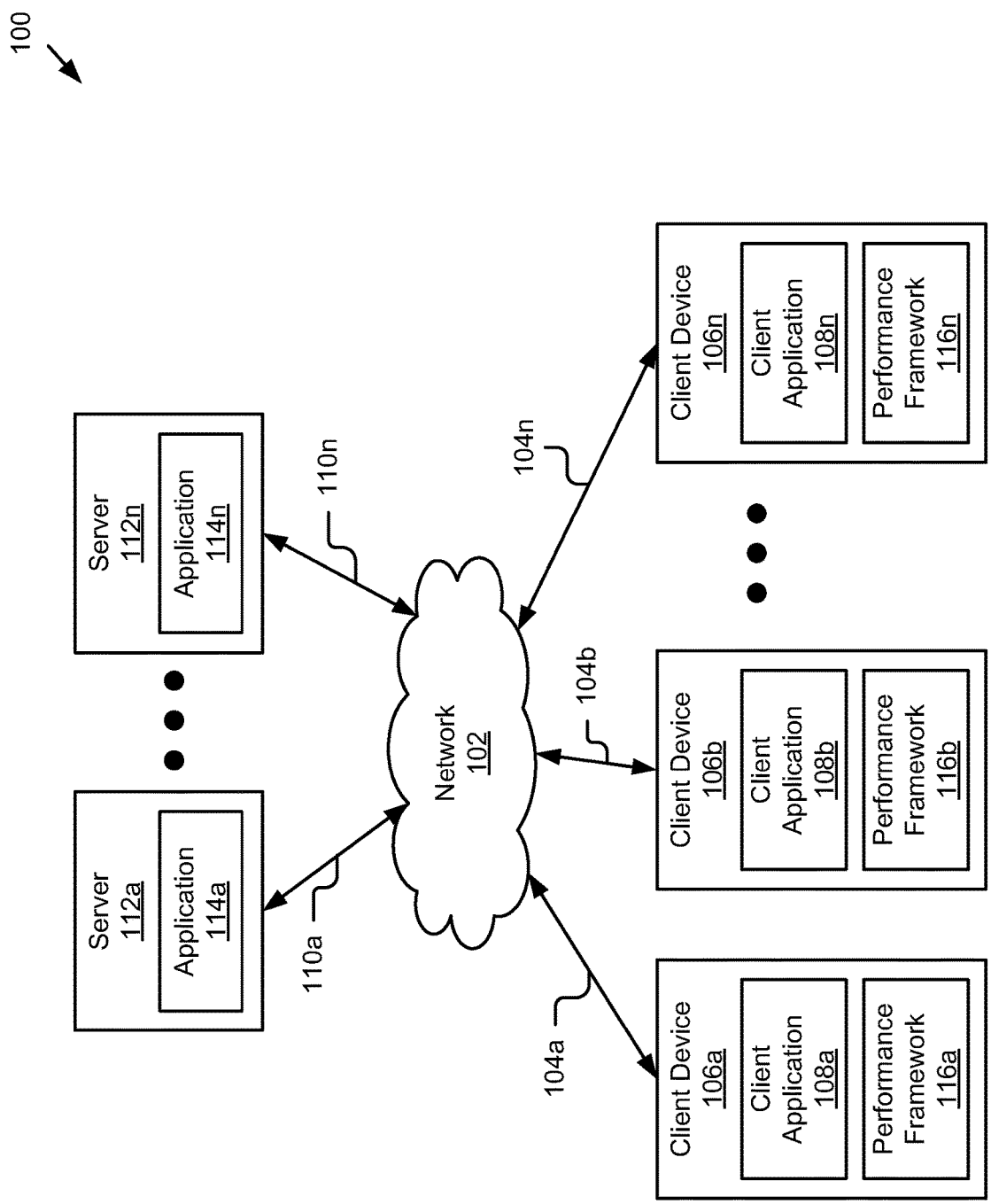
FIG. 1 is a block diagram illustrating an example system for expediting the processing and handling of the events.

The performance technology described herein can expedite the processing and handling of one or more events received on a rendered context (e.g., surfaces, HTML documents, DOM elements, document fragments, etc.). An observer/user, which can be a person providing control inputs using a pointer device, a touch surface, open-air gesture device, etc., can view surfaces via viewport. The viewport acts like a window for viewing into a multi-dimensional (e.g., 3D) space where the surfaces are rendered and translated. The viewport may be fixed or may be translated by the performance technology independent of or in conjunction with the surfaces viewable via the viewport. In some implementations, the viewport may correspond to the surface that coincides with either a screen of the device being used (e.g., a smartphone, tablet, television, projector, etc.) or a window or sub-window displayed on such a device.

The surfaces can be rendered and displayed within the viewport. Surfaces include documents or document fragments. Example surfaces include, but are not limited to, stylized HTML elements (e.g., divs, spans, tables, etc.), images, and videos. The surfaces may or may not be displayed within the viewport. If a surface is "off-screen", it may still exist but not be visible and not require computation to render it. Every surface, including the viewport, can be arbitrarily translated to anywhere else in the multi-dimensional space and every one of these surfaces can have their translation impacted by the calculations produced by the control inputs.

The performance technology, which may be embodied, at least in part, by the performance framework discussed herein, can convert the control inputs (also referred to herein as inputs) into a series of energy agents with direction and magnitude. Example inputs that can be used as a source for computing the energy agents include, but are not limited to (1) touch screen gestures (e.g., swipes, taps, pinches, etc.); (2) pointer device inputs (e.g., mouse inputs like click, drag, etc.), (3) keyboard inputs (e.g., arrow up, down, left, right, etc.), and (4) motion gesture system inputs (e.g., 3D point clouds computed by Microsoft Kinect, LeapMotion, etc.). The energy agents include vectors having magnitude and/or directionality. The energy agents may emulate forces like acceleration, friction, tension, elasticity, gravity, torque, thrust, drag, damping, greasing, etc. For instance, example energy agents may include, but are not limited to, acceleration in a first direction, friction in a second dimension, grease and damping. These simulated forces may correspond to real-world phenomena such as a spring, friction, drag, magnet, motor (applied force), etc. However, these kinematic forces are not limited to real-world forces and approximations thereof, and may include idealized forces or imaginary forces. The usage of idealized and imaginary forces can be used to create novel effects that are supernatural but cognitively consistent across the entire system of surfaces subject to such forces.

The application of these energy agents by the performance technology to a surface may cause one or more surfaces to translate in multi-dimensional space in accordance with the summation of the applied energy agents. For example, the movement of a finger on a touch screen in a first direction may be converted directly into energy vector agents corresponding to applied force in that first direction. In addition to the application of energy agents to surfaces, energy agents may also be applied to the viewport.

Different kinematic effects can be applied to the surfaces by applying multiple energy agents to a surface. In addition, energy agents may be produced programmatically, without and/or in conjunction with the receipt control inputs, to create kinematic animations of the surfaces or modify the behavior of those surfaces in the presence of an applied force. For example, a friction energy vector agent may be applied to surface and activated when a force is applied to that surface. An applied force agent in a first direction could activate a friction agent in a second direction opposite to the first direction. Energy can be opposing or complementary and more than two can be applied to a surface at one time. This can result in an effect in a wide range of sophisticated effects, such as torque on a surface anchored to a point or skidding on a slippery surface when a first applied force is added in a first direction to that surface and a second applied force is added to that surface in a second direction differing from the first direction, but not opposite to it, while that surface is still under the influence of the force agents acting in the first direction.

Although various implementations are described herein within the context of web browsers, it should be understood that these and other implementations may also apply to other software applications, including for example, operating systems, in which access to Graphics Processing Unit (GPU) rendering and GPU primitives for allowing translation of surfaces in 3D space is made available. In addition, while the performance framework 116 (e.g., see FIG. 1) is described, in various implementations, as interacting with a rendering engine 230 (e.g., see FIG. 2B) and/or DOM of a web browser, it should be understood that other technologies, such as Web GL, Open GL, or other technologies may also be applicable and be used.

FIG. 1 is a block diagram of an example system 100 for expediting the processing and handling of the events. The illustrated system 100 includes client devices 106*a* . . . 106*n* and servers 112*a* . . . 112*n*, which are communicatively coupled via a network 102 for interaction with one another. For example, the client devices 106*a* . . . 106*n* may be respectively coupled to the network 102 via signal lines 104*a* . . . 104*n*, and may respectively include client applications 108*a* . . . 108*n* and performance frameworks 116*a* . . . 116*n*. The servers 112*a* . . . 112*n* may be respectively coupled to the network 102 via signal lines 110*a* . . . 110*n*. The use of the nomenclature "a" and "n" in the reference numbers indicates that the system 100 may include any number of those elements having that nomenclature.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, peer to peer (P2P) networks, close proximity communication networks (e.g., Bluetooth®, NFC, etc.), various combinations thereof, etc.

Figure 2A:
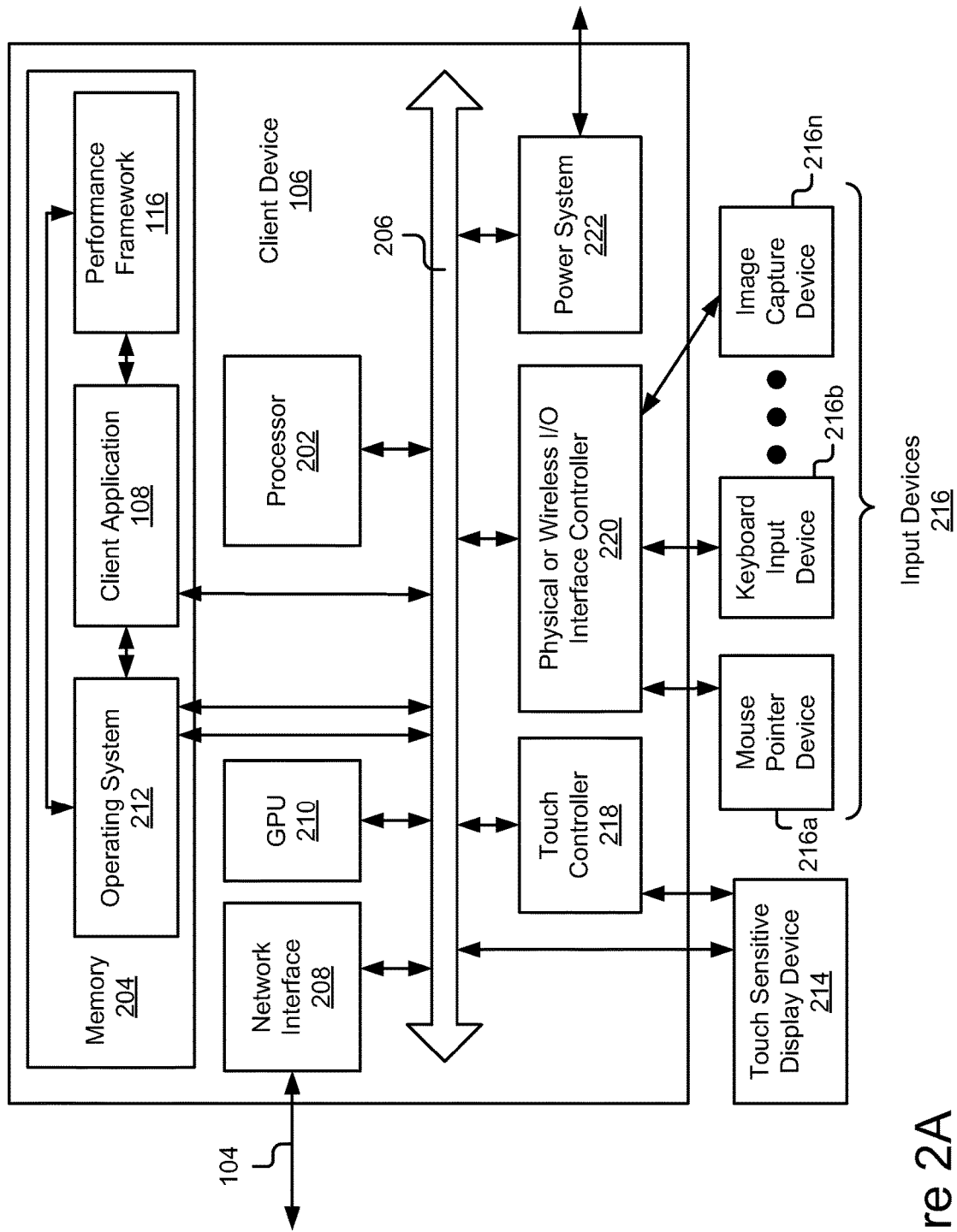
FIG. 2A is a block diagram illustrating an example client device.

The client devices 106a . . . 106n (also referred to individually and collectively as 106) are computing devices having data processing and communication capabilities. In some implementations, a client device 106 may include a processor (e.g., virtual, physical, etc.), a memory, a power system, a network interface, a GPU, a touch controller, a physical or wireless I/O interface controller, a display device, an input device as shown in FIG. 2A, and/or other software and/or hardware components, including, for example, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 108a . . . 108n of a client application (also referred to individually and collectively as 108) and instances of a performance framework 116a . . . 116n (also referred to individually and collectively as 116). The client application 108 and the performance framework 116 may be storable in a memory (e.g., memory 204 as shown in FIG. 2A) and executable by a processor (e.g., processor 202 as shown in FIG. 2A) of a client device 106, implementable using a hardware solution (e.g., ASICs, field programmable gate arrays), a combination of the foregoing, etc.

The client application 108 may include a browser application that can retrieve and/or process information hosted by one or more entities of the system 100 (for example, the servers 112) and can present the information on a display device (e.g., touch sensitive display device 214 as shown in FIG. 2A) on the client device 106. The performance framework 116 is configured to efficiently manipulate surfaces in multi-dimensional space using energy agents and/or processed events in cooperation with the client application 108, an operating system, and/or other components. In some implementations, the performance framework 116 may determine the state of physics for a surface and map it to the state of the scene, optimize the state of the scene, and then provide the state of the scene to the rendering engine 230 (e.g., see FIG. 2B-D) to be mapped to a corresponding DOM representation. Additional acts, structure, functionality and/ or description of the client application 108 and the performance framework 116 are discussed in further detail elsewhere herein.

The servers 112a . . . 112n (also referred to individually and collectively as 112) may each include one or more computing devices having data processing, storing, and communication capabilities. For example, a server 112 may include one or more hardware servers, server arrays, storage devices and/or systems, etc. In some implementations, the servers 112a . . . 112n may include one or more virtual servers, which operate in a host server environment and access the physical hardware of the host server including, for example, a processor, memory, storage, network interfaces, etc., via an abstraction layer (e.g., a virtual machine manager).

In the depicted implementation, the servers 112a . . . 112n include applications 114a . . . 114n (also referred to individually and collectively as 114) operable to provide various computing functionalities, services, and/or resources, and to send data to and receive data from the other entities of the network 102, such as the client devices 106. For example, the application 114 may provide functionality for user account management, internet searching; social networking; web-based email; word-processing; banking; finance; blogging; micro-blogging; photo management; video, music and multimedia hosting, distribution, and sharing; business services; news and media distribution; any combination of the foregoing services; etc. It should be understood that the application 114 is not limited to providing the above-noted services and may include other network-accessible services.

The applications 114 may transmit electronic files and/or data embodying the services they provide to the client devices 106 for rendering by the client application 108 operable thereby. In some implementations, the electronic files and/or data streams may be formatted using a markup language(s) (e.g., HTML, XML, etc.), style sheet(s) (e.g., CSS, XSL, etc.), graphic(s) (e.g., PNG, JPG, GIF, etc.), and/or scripts (e.g., JavaScript, ActionScript, etc.), and the client devices 106 may interpret and/or execute the electronic files and/or data streams and render an interactive Web User Interface (WUI) for presentation to users on a display device (e.g., touch sensitive display device 214 as shown in FIG. 2A).

It should be understood that the system 100 illustrated in FIG. 1 is representative of an example system for expediting the processing and handling of the events, and that a variety of different system environments and configurations are contemplated and are within the scope of the present disclosure. For instance, various structural and/or functional aspects may be moved from a server to a client, or vice versa and some implementations may include additional or fewer computing devices, services, and/or networks, and may implement various acts, functionality, etc., client or server-side. Further, various entities of the system may be integrated into to a single computing device or system or additional computing devices or systems, etc.

FIG. 2A is a block diagram of an example client device 106, which includes various hardware and/or software components. As depicted, the client device 106 may include a processor 202, a memory 204, a network interface 208, a GPU (graphical processing unit) 210, a touch controller 218, a physical or wireless I/O interface controller 220, a power system 222, a touch sensitive display device 214, and one or more input devices 216a . . . 216n (also referred to individually and collectively as 216), which may be communicatively coupled by a communication bus 206. The client device 106 depicted in FIG. 2A is provided by way of example and it should be understood that it may take other forms and include additional or fewer components without departing from the scope of the present disclosure.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (e.g., the touch sensitive display device 214), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the client device 106 including, for example, the memory 204, the network interface 208, the GPU 210, the touch controller 218, the physical or wireless I/O interface controller 220, the power system 222, the touch sensitive display device 214, and the input devices 216.

The memory 204 may store and provide access to data to the other components of the client device 106. In some implementations, the memory 204 may store instructions and/or data that may be executed by the processor 202. For example, as depicted, the memory 204 may store an operating system 212, the client application 108, and the performance framework 116. The memory 204 is also capable of storing other instructions and data, including, for example, hardware drivers, other software applications, databases, etc. The memory 204 may be coupled to the bus 206 for communication with the processor 202 and the other components of the client device 106.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blu-ray™, etc.). It should be understood that the memory 204 may be a single device or may include multiple types of devices and configurations.

The bus 206 can include a communication bus for transferring data between components of a computing device or between computing devices, a network bus system including the network 102 or portions thereof, a processor mesh, a combination thereof, etc. In some implementations, the memory 204, the network interface 208, the GPU 210, the touch controller 218, the physical or wireless I/O interface controller 220, the power system 222, the touch sensitive display device 214, and/or the input devices 216 operating on the client device 106 may cooperate and communicate via a software communication mechanism implemented in association with the bus 206. The software communication mechanism can include and/or facilitate, for example, secure and/or unsecure inter-process communication, local function or procedure calls, remote procedure calls, an object broker, direct socket communication among software modules, UDP broadcasts and receipts, HTTP connections, etc.

The network interface 208 may include one or more interface devices for wired and wireless connectivity with the network 102 and the other entities and/or components of the system 100 including, for example, the servers 112, etc. For instance, the network interface 208 may include, but is not limited to, CAT-type interfaces; wireless transceivers for sending and receiving signals using Wi-Fi™; Bluetooth®, cellular communications, etc.; USB interfaces; various combinations thereof; etc. The network interface 208 may be coupled to the network 102 via the signal line 104 and may be coupled to the other components of the client device 106 via the bus 206. In some implementations, the network interface 208 can link the processor 202 to the network 102, which may in turn be coupled to other processing systems. The network interface 208 can provide other connections to the network 102 and to other entities of the system 100 using various standard communication protocols, including, for example, those discussed elsewhere herein.

The GPU (graphical processing unit) 210 may render one or more images for display by performing various input/output, logical, and/or mathematical operations. The GPU 210 may have various computing architectures to process data signals including, for example, a parallel processing architecture, a complex instruction set computer (CISC) architecture, a reduced instruction set computer (RISC) architecture, and/or an architecture implementing a combination of instruction sets. The GPU 210 may be physical and/or virtual, and may include a single core or plurality of processing units and/or cores. In some implementations, the GPU 210 may be capable of generating and providing electronic display signals to the touch sensitive display device 214, supporting the display of images, capturing and transmitting images, performing complex tasks including various types of feature extraction and sampling, etc. In some implementations, the GPU 210 may be coupled to the memory 204 via the bus 206 to access data and instructions therefrom and store data therein. In some implementations, the GPU 210 may perform its acts and/or functionalities as described herein in cooperation with the processor 202 and/or one or more components of the client device 106. For instance, the bus 206 may couple the GPU 210 to the processor 202 and other components of the client device 106 including, for example, the memory 204, the network interface 208, the touch controller 218, the physical or wireless I/O interface controller 220, the power system 222, the touch sensitive display device 214, and/or the input devices 216. In some implementations, the GPU 210 may be integrated with the processor 202.

The touch sensitive display device 214 is a touch-screen display (e.g., OLED, AMOLED, etc.) capable of receiving input from one or more fingers of a user. For example, the touch sensitive display device 214 may be a capacitive touch-screen display capable of detecting and interpreting multiple points of contact with the display surface. The touch sensitive display device 214 may be managed by a touch controller 218, which relays and/or passes the inputs/signals received on the display device 214 to one or more components of the client device 106 including, for example, the GPU 210, the processor 202, the memory 204, the network interface 208, etc., via the bus 206. The touch sensitive display device 214 may include one or more transparent touch sensitive layers that are integrated with the touch sensitive display device 214 and capable of sensing input/gestures from the one or more fingers of a user. While a touch sensitive display is described, it should be understood that a conventional display device (e.g., LCD, projector, TV, etc.) is also applicable and may be used.

The input devices 216a . . . 216n (also individually and collectively referred to as 216) may include motion-detecting input devices, pointer devices, keyboards, audio input devices, other touch-based input device, etc. For example, the input devices 216 may include a touch-screen, microphone, a front facing camera, a rear facing camera, and/or motion sensors, etc. In particular, as depicted in the figure, the input devices 216 may include a mouse pointer device 216a, a keyboard input device 216b, an image capture device 216n, etc. The input devices 216 may be managed by a physical or wireless I/O interface controller 220, which relays and/or passes the inputs/signals received from users via the input devices 216 to one or more components of the client device 106 including, for example, the touch controller 218, the touch sensitive display device 214, the GPU 210, the processor 202, the memory 204, the network interface 208, etc., via the bus 206.

The input devices 216a . . . 216n and/or the touch sensitive display device 214 may be configured to receive a variety of control inputs (e.g., gestures) from users. Non-limiting examples of the inputs may include a single touch gesture (e.g., swipe, tap, flick, stroke, etc.), a multiple touch gesture (e.g., zoom, grab, etc.), a mouse click, a keyboard stroke, a voice gesture (e.g., speech to text, voice command, etc.), a motion gesture (e.g., hand signal, body signal, eye movement, etc.), etc. Various inputs received via the input devices 216a . . . 216n and/or the touch sensitive display device 214 may be interchangeably referred to herein as events.

The power system 222 includes a power source and/or components for supplying electrical power to the components of the client device 106. As depicted, the power system 222 may be coupled to the bus 206 to provide power to the hardware components coupled thereto. In some implementations, the power system 222 may include one or more of a regulated power supply (e.g., AC power supply), a transformer (AC/DC converter), one or more energy storage devices (e.g., a rechargeable battery), wiring, etc.

Figure 2B:
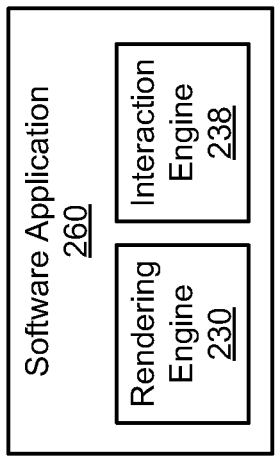
FIG. 2B is a block diagram illustrating an example software application.

FIG. 2B is a block diagram of an example software application 260. In some implementations, the software application 260 represents the client application 108 and/or the operating system 212, although the software application 260 may also represent other types of software like native applications. As depicted, the software application 260 may include a rendering engine 230 and an interaction engine 238.

The rendering engine 230 may include software and/or logic for processing content and formatting information for display. The rendering engine 230 can coordinate visual effects (e.g., surface transformations, cosmetic effects, etc.) to be applied to a renderable context with the control inputs provided by a user for the context or based on one or more events detected on the context so the experience is responsive and satisfying to the user.

In some instances, the rendering engine 230 may generate a rendering from scene data, which can be displayed on a display device, such as the touch sensitive display device 214. For example, the rendering engine 230 may receive a scene graph from the surface translation engine 236 (e.g., see FIGS. 2C and 2D), in which necessary matrices transformations have already been calculated. In some instances, geometric, modeling, camera, and/or other transforms may already be performed by the surface translation engine 236 based on information received from the physics engine 234 and/or the input engine 232 (e.g., see FIGS. 2C and 2D).

This can reduce or eliminate the amount of matrix multiplication (e.g., translation, scaling, rotation, projection, etc.) that needs to be performed by the rendering engine 230, thus substantially improving the overall performance (e.g., speed and visual quality) of the software application 260. As a further example, a CPU (e.g., processor 202) may handle computing the transformation matrices to place individual surfaces from scene data, and a GPU (e.g., GPU 210) uses those matrices, along with texture data, to actually place the pixels within. For instance, the surface translation engine 236 may allow for efficient computation of the individual transformation matrices by utilizing high-level scene-specific data to eliminate the computation of some matrices (e.g., low-level scene-specific data) and re-using various pre-computed components.

The rendering engine 230 can utilize APIs that provide direct access to GPU hardware acceleration and primitives for efficient translation of objects (e.g., surfaces, documents, document fragments, etc.) in multiple dimensions (e.g., 2D, 3D, etc.). For example, the rendering engine 230 may utilize a graphics stack to efficiently rasterize vector graphics into raster images (e.g. pixels) for display via a screen. Using the scene graphs generated and provided to the rendering engine 230 by the surface translation engine 236 (e.g., see FIGS. 2C and 2D), the rendering engine 230 can render the content sufficiently fast (e.g., @60 fps) so that the animations being applied to the viewable surfaces are smooth and seamless to the viewer, and undesirable artifacts (e.g., jitter) are eliminated.

The rendering engine 230 may process the scene graph progressively from the roots up through to the leaves, and apply the matrices corresponding to nodes of the scene graph to associated DOM elements that represent those items on the display. For nodes that do not have corresponding DOM elements (e.g., <divs>), the rendering engine 230 may interact with the DOM to create them. For nodes that have been deleted, the rendering engine 230 may delete the corresponding DOM elements. In some instances, the scene graph may map the nodes of the scene graph with the DOM elements using unique IDs, and the rendering engine 230 can use these IDs to identify the corresponding DOM elements.

In some implementations, the rendering engine 230 may process markup content like HTML, XML, etc., apply presentational instructions encoded in CSS, XSLT, etc. to the markup content, interact with a JavaScript Interpreter to execute various objects, methods, etc., that may manipulate the content, and then provide the formatted content for display to a user on the display device 214.

Figure 2C:
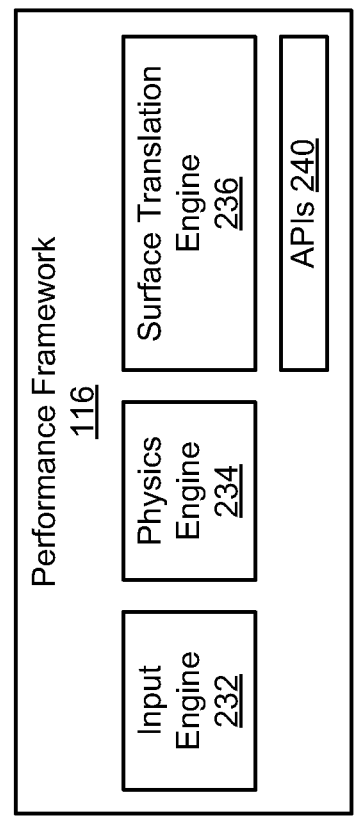
FIG. 2C is a block diagram illustrating an example performance framework.
Figure 2D:
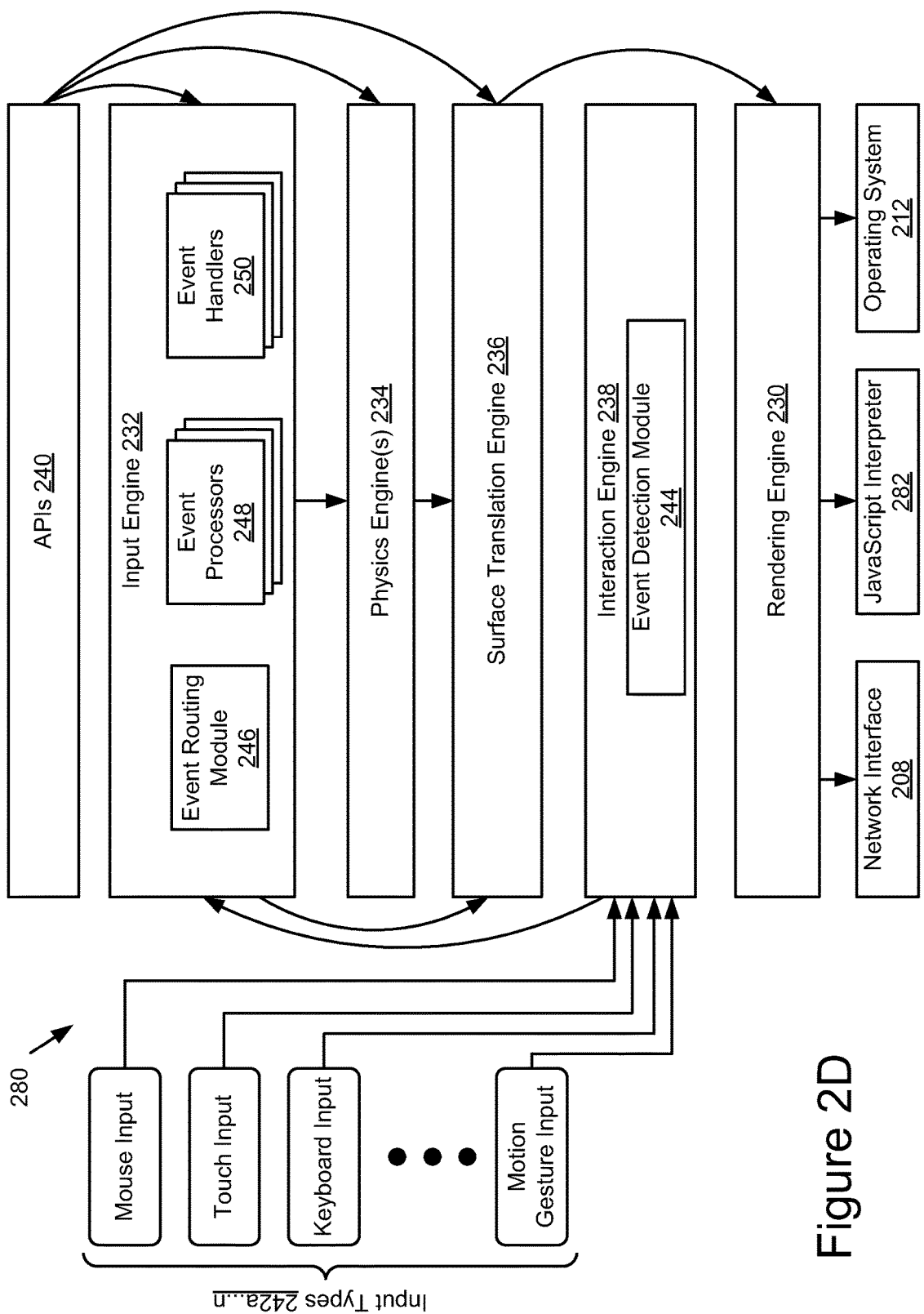
FIG. 2D is a block diagram illustrating various structure, acts, and/or functionality of the example performance framework.

As shown in FIG. 2D, the rendering engine 230 may be coupled to the network interface 208 to send and receive data (e.g., via the network 102). The rendering engine 230 may be coupled to the JavaScript Interpreter 282 to interpret JavaScript objects configured to handle and process events, perform physics-related calculations, generate scene graphs, control various aspects of the software application 260, communicate with other entities (e.g., asynchronously), manipulate the content being process for display (e.g., DOM elements, etc.), etc. The rendering engine 230 may be coupled to the operating system 212 to store and access files via a file system, access one or more databases, utilize various APIs, etc., receive instructions, etc.

The interaction engine 238 may include software and/or logic for receiving and interpreting user inputs and/or events from the input devices 216. As depicted in FIG. 2D, the interaction engine 238 may include an event detection module 244. The event detection module 244 may be coupled to receive control inputs from touch controller 218 that are input by users via the touch sensitive display device 214 and/or the input devices 216. In some implementations, the event detection module 244 may be configured to detect one or more events on one or more surfaces that are rendered for display to the user based on the control inputs provided by the user. For instance, the control input provided by the user may trigger one or more events on the one or more surfaces. In some implementations, the touch controller 218 may determine and provide positional information associated with each point of contact with the touch sensitive display device 214 to the interaction engine 238. The event detection module 244 of the interaction engine 238 may interpret the inputs and provide events associated with the inputs to the input engine 232 for further processing.

FIG. 2C is a block diagram of an example performance framework 116, which includes an input engine 232, a physics engine 234, a surface translation engine 236, and APIs 240. FIG. 2D is a block diagram illustrating various structure, acts, and/or functionality of the example performance framework 116. The input engine 232, the physics engine 234, the surface translation engine 236, and/or the APIs 240 may be communicatively coupled by the bus 206 and/or the processor 202 to one another and/or the other components 204, 208, 210, 214, 216, 218, 220, and/or 222 of the client device 106. In some implementations, one or more of the input engine 232, the physics engine 234, the surface translation engine 236, and/or the APIs 240 are sets of instructions executable by the processor 202. In some implementations, one or more of the input engine 232, the physics engine 234, the surface translation engine 236, and/or the APIs 240 are stored in the memory 204 of the client device 106 and are accessible and executable by the processor 202. In any of the foregoing implementations, the input engine 232, the physics engine 234, the surface translation engine 236, and/or APIs 240 may be adapted for cooperation and communication with the processor 202 and other components of the client device 106.

The input engine 232 includes software and/or logic for receiving and processing events provided by the interaction engine 238. An event may be detected on a rendered context. A renderable context can include one or more objects that are capable of interacting with one another and that could affect another's behavior within the context. The renderable context and/or objects are also interchangeably referred to herein in some cases as surfaces. In some implementations, a rendered context may be a viewport (e.g., a window, a frame, an HTML container element, etc.) and may include elements within it, such as scroll views, containers, images, media objects, etc. The elements may be visible or non-visible to a viewer. In a 3D virtual space, a rendered context may be a heads-up display that is presented to a user on top of another context that is 3D interactive working space. Each rendered context may be associated with one or more instances of a physics engine 234, as discussed in further detail elsewhere herein.

In some cases, a final specification for a renderable context can be produced using a renderable object of the performance framework 116. The renderable object may include a render object that accepts a render specification as an input. The render specification may include:
 Entity (e.g., surface) identifier
 Transform definition (an object with the following keys)
 target: mandatory (what to apply the transform on)
 transform: the transformation matrix (use framework to help generate)
 opacity: opacity to apply
 size: treat everything inside target as a single surface with defined size
 origin: [0 . . . 1, 0 . . . 1] coordinate to use for zero point expressed as percentage offsets (i.e. [0, 0]=top-left, [0.5, 0.5]=center, [1, 0]=top-right), [0.5, 0.5, 0]=center front of cube, [0.5, 1, 1]=center bottom of rear of cube, etc.
 Array of other render specs The final specification can be used by the surface translation engine 236 to build a corresponding scene graph. As a further example, a renderable context may be a window that includes a title bar, action buttons, and content area. As shown, the contents of the window may have various 'transform' effects applied during the lifecycle of the window. In the context of a web browser, a rendered context may default to an origin of [0, 0] when instantiated to target an HTML div.

In some cases, the performance framework 116 includes a scene software object that allows a developer to conveniently define the scene of a renderable context. For example, representative code for defining a scene may include:
 var FamousScene=require('famous/Scene');
 var myScene=new FamousScene(sceneDef);
 myContext.contentFrom(myScene);
where sceneDef may be a software object representing the structure of a scene. In the web browser context, the structure of the sceneDef may be scene that may share characteristics with a scene graph and/or scene graph node. In some cases, transforms may be defined as matrices like
 transform:
 rotateY: 0.1
 scale: [2, 2, 1]
 translate: [0, −10, 0]
The format of a transform may specify a desired transform, which may be based on applying a set of canonical transforms in order. The scene software object may interpret that definition and generate the transformation matrix to produce that effect.

As a further example, a developer could define a scene using a serialization language like YAML, JSON, etc., and process/minify it for runtime by generating optimal code for a JavaScript object that produces a corresponding scene graph.

Returning to FIG. 2D, the events received and processed by the input engine 232 may correspond to various gestures made by a user using one or more input devices 216, as described elsewhere herein. As depicted, the inputs types 242a . . . n may include mouse inputs, touch inputs, keyboard inputs, motion (e.g., open-air) gesture inputs, etc. In a further example, the inputs may be touch or motion-based inputs respectively captured by the touch sensitive display device 214 and the image capture device 216n. As a further example, the representative inputs may include, but are not limited to, a tap, swipe, pinch, rotation, hand motion, body motion, etc. The interaction engine 238 may capture the inputs and send them to the input engine 232 for processing. In some instances, a surface rendered for display may be notified of an event by the event detection module 244 of the interaction engine 238, and the event detection module 244 may pipe the event to the input engine 232 for processing.

In some instances, the interaction engine 238 of a web browser, operating system, or other application may capture an event with respect to one or more contexts, which may trigger the event detection module 244 defined in association with the context(s), and the event may be piped to the input engine 232, where it is processed and then output to one or more instances of the physics engine 234 and/or the surface translation engine 236 that correspond to the context(s).

As a further example, an input received from the interaction engine 238 may, in some cases, be received as an HTML event and may be tied to one or more surfaces. The HTML event may include positional information associated with the user input and information about what target surface(s) are affected. As an example, a given surface in an HTML document rendered for display, and user inputs received corresponding with that surface may be captured upon input by the interaction engine 238 and piped to the input engine 232 for processing.

The input engine 232 upon receiving one or more events from the interaction engine 238 may determine a route for routing the one or more events to one or more event processors 248 for processing. For instance, the event routing module 246 may determine a route for each event. In some implementations, the event routing module 246 may determine a route for an event based on characteristics associated with that event. For example, event characteristics may include a force with which the event was detected on a rendered context, a velocity associated with that event, a position where the event was detected, a direction in which the event was intended to be performed by a user, number of points of contact associated with that event including a single point contact (tap, swipe, drag, flick, etc.), a multi-point contact (zoom in, zoom out, two finger tap, rotate, three-finger swipe, etc.), etc.

By determining the event characteristics for an event, the event routing module 246 may accurately determine event processor(s) 248 suitable to process that event and route the event to the proper set of event processor(s) 248. For instance, different event processors 248 may be configured to process different events with certain characteristics. Once a route is determined for each event based on the event characteristics, the event routing module 246 may then route each event to one or more event processors 248 for processing using the route.

It should be understood that routing events based on event characteristics is just one possible variation used by the event routing module 246 and that other variations are also possible and/or contemplated for routing events. For example, an initial routing segment may route the event to an initial event processor 248 for processing, but the subsequent route segment from that event processor 248 to another, or from that event processor 248 to an event handler 250, etc., may be dynamically determined based on the output produced by the initial event processor 248. Further segments in the series may be similarly dynamically determined. For instance, if the output processed by first event processor 248 meets one or more first criteria, the first event processor 248 may provide the output (as input) to a second event processor 248 which may further process the input accordingly. Alternatively, if the output processed by the first event processor 248 meets one or more second criteria, the first event processor 248 may provide the output (as input) to a third event processor 248, or another entity such an event handler 250, and so forth. These dynamic route determinations may be made individually by the event processor(s) 248, by the routing module (246), by interaction and/or cooperation between the foregoing, etc. It should be understood that a nearly limitless number of variations in sequences is possible and/or may be used to efficiently and accurately process an event, such as a user input.

In yet further examples, the event routing module 246 may route one or more events to one or more event processors 248 randomly using a randomness algorithm, may route the one or more events to the one or more event processors 248 serially based on a serial order, in series parallel, etc., depending on the intended result.

In some implementations, the event routing module 246 may decide to bypass processing for an event by event processor(s) 248 based on the event characteristics associated with the event. For instance, the event routing module 246 may determine that the event meets a predetermined processing criterion based on the event characteristics associated with the event. By way of an example, the event routing module 246 may determine that an objective that a user is intending to achieve on one or more surfaces by providing an input triggering an event on the surfaces is already accomplished based on the event characteristics associated with the event. The event routing module 246 may then bypass the processing for the event and directly route the event to one or more event handlers 250 for handling, as further discussed below.

Figure 6:
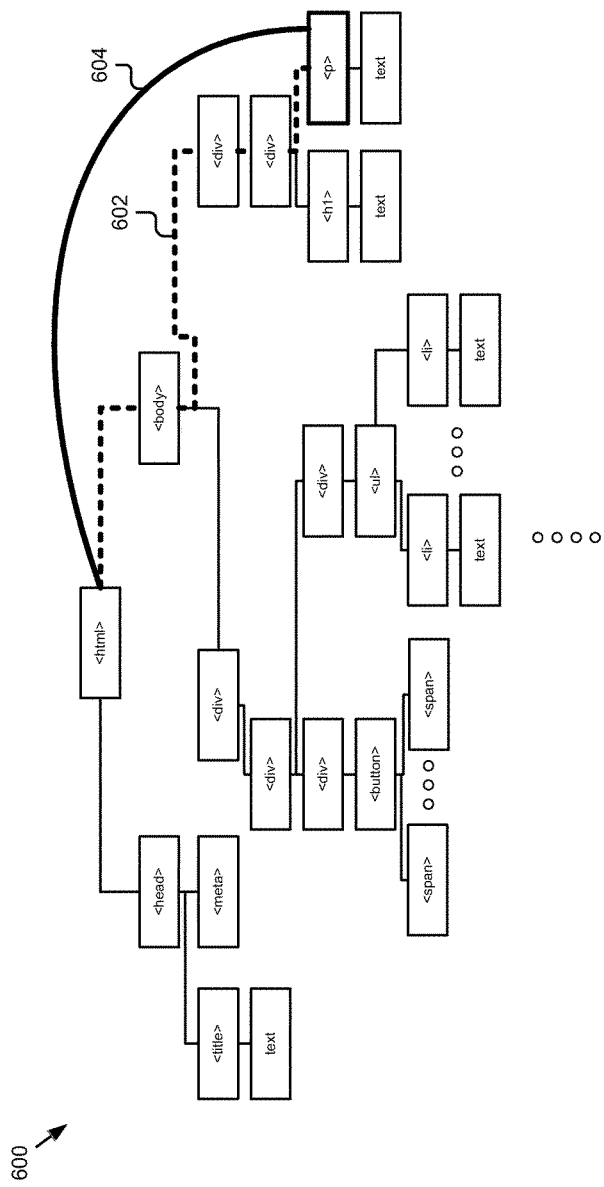
FIG. 6 is a graphical representation of an example user interface depicting handling and processing of events when applied to DOM elements.

In some implementations, the event routing module 246 may terminate an event. For instance, if the event routing module 246 while trying to determine one or more characteristics or properties for the event determines that no characteristics or properties are associated with the event or that the number of characteristics or properties are below a certain threshold, the event routing module 246 may discard the event and any processing/handling for the event. Bypassing event processing or terminating an event by the event routing module 246 is advantageous as unnecessary processing for the event can be eliminated in early phases as opposed to the standard event processing procedure defined by the document object model, for example, as depicted in FIG. 6.

The event processors 248 include software and/or logic for processing events received from the event routing module 246. In some implementations, one or more event processors 244 are each capable of processing different types of events. Representative event processors 248 may include, but are not limited to gesture processors like a pinch processor for processing pinch-to-zoom gestures, a touch processor for processing touch and tap gestures, a touch sync for synchronizing events received from multiple sources, a swipe processor for processing swipe gestures, a hand motion gesture processor for processing one or more hand motions, etc., although other events may also be processed, such as time-triggered events, content-triggered events, location-triggered events, resource-utilization-triggered events, physical or virtual environment-triggered events, etc. As a further example, the event routing module 246 can receive a low-level event emitted by an event source, pipe it to one or more processors 248, which can then process the event and pipe higher-level events downstream, respond to the event, etc.

In some instances, an event processor 248 can consider the input history of an event to determine how to process the event. In some implementations, the event processor 248 may interpret and integrate a current input (e.g., low-level event) with a set of previous inputs reflecting higher level event (e.g., a rotate gesture, zoom gesture, a combination of the foregoing, etc.) based on the properties of the low-level event. For instance, the event processor 248 may determine whether the input event is a new touch or a continuation of a series of previous touches. This determination can be based on the connection between the properties of the previous event(s) received and the current event being processed, including movement (target surface, difference in position between events, continuity between events, time elapsed between events, etc.). As a further example, for a series of raw inputs that collectively describe a finger swipe across a touchscreen, the event processor 248 can identify the series of raw inputs as forming the swipe. In this example, the event state for the first input in the series may be determined as new, and the event states for the subsequent inputs in the series may be determined as continuous with the first input.

In some implementations, one or more of the event processors 248 may be an input tracker that computes input vectors for each input received. The input vectors may represent the position and/or magnitude of the input. For instance, for a swipe gesture with one finger, the input tracker may compute vectors describing the position and magnitude of the finger as it swipes across the touch-sensitive surface. For a rotate gesture with two fingers, the input tracker may compute vectors describing the position and magnitude of each of inputs corresponding to the fingers as they move along curved trajectories on the touch-sensitive surface. In some instances, the input tracker may pipe the input vectors to one or more event processors 248 for further processing, which may interpret the input vectors to determine the objective(s) the user is attempting to accomplish (e.g., zoom, rotate, pinch, select, etc.). For instance, a rotate gesture input may be handled by a rotate processor that considers the vectors of the two points of contact associated with the rotate event and determine tension and rotation parameters based thereon. In some instances, the input tracker may route the events to the proper sequence of one or more event processors 248 based on the properties of the events (e.g., input vectors, surfaces affected, other metadata, etc.).

Once the events are processed by the event processors 248, the event processors 248 can pass processed events and data describing or quantifying the processed events (e.g., a zoom amount, pinch amount, select amount, etc.) to event handlers 250 for handling. In some implementations, to pass a particular event, an event processor 248 may implement an emit method, which may be called by an event emitter to provide notification to an handler 250 that the event has been processed and ready for handling. The event emitter may implement a pipe method, which adds a given event to a set of one or more handlers 250 to which the event will be piped to, and may implement an unpipe method to remove an event from a handler 250. An event handler library may also be used in conjunction with event emitters to handle the events. The event emitter may emit an event, and the event data for that event may be dispatched to a handler 250, for instance, by calling an on(eventName, handler) function with a corresponding argument. For example, the emit( )method may be used to emit an event, and the on( ) function may attach a handler 250 to an event (which can be dispatched on emit). The pipe( )method may designate downstream event handler 250 to emit events to. An event handler 250 may be designated to be used for input and output. In some cases, if both the functions (e.g., input and output) are desired, then two separate event handlers 250 may be required and used. An unbind(eventName, handler) method may be called to step dispatching events to the handler 250 that was added using the on method.

The event handlers 250 include software and/or logic for handling the events received from the event processors 248 and/or the event routing module 246. In some instances, handling an event may include determining for the event whether the event is fully processed and whether the objective associated with that event that a user intends to achieve is clear or accomplished. In case, an event handler 250 determines that an event needs further processing, the handler 250 may send that event to one or more event processors 248 for further processing. In some instances, the event handlers 250 may send the event needing further processing to the event routing module 246, which may then route the event to event processor(s) 248 based on routing criteria as described above with respect to the event routing module 246.

In case the event handler 250 determines that an event is fully processed and interpreted and that no further processing is required, the event handler 250 may, in some instances, determine whether there are any physics parameters and/or properties associated with the event that needs to be processed. If the event handler 250 determines one or more unprocessed physics parameters to be associating with the event, the event handler 250 may then send the event including the one or more unprocessed physics parameters to one or more instances of the physics engine 234 for processing. If on the other end the event handler 250 determines no physics parameters to be associated with the event, the event handler 250 may send the event to the surface translation engine 236 to render one or more surfaces affected and/or associated with the event for display as described in further detailed below with respect to the surface translation engine 236.

The physics engine 234 includes software and/or logic for computing visual effects (e.g., kinematic effects such as movements, translations, etc.) for a rendered context(s) and/or one or more of the objects associated with that context based on the associated energy agent(s) and/or events. An energy agent is configured to act on a rendered context and/or the objects of a rendered context. An energy agent may be computed in terms magnitude and/or directionality. For example, an energy agent may include one or more force vectors.

A rendered context may be associated with one to many instances of a physics engine 234, and a physics engine 234 may be associated with one to many rendered contexts. Thus, more than one instance of the physics engine may be initialized upon the loading of a viewport. The viewport may have more than one rendered context, and each of those contexts may be associated with the same instance of the physics engine 234 or a different instance. For example, the viewport may have a context for the camera/viewing surface associated with the viewport which can be panned around, rotated, etc., and have specific energy agents attached that give the camera its properties; a scroll view region that allows the user to scroll and select from different items (e.g., folders, images, videos, files, etc.) in a multi-dimensional space and has specific energy agents attached that give it properties such as a bounce-back once the end of a list of items has been reached, and main interaction region that allows the user to interact with the items in a multidimensional space which may have specific energy agents attached to provide that context with its own unique environmental properties. Each of these contexts may be interacted with independently from one another and the inputs associated with each of these contexts may be piped to different instances of the physics engine 234. In a further example, related contexts that are loaded on disparate client devices 106 may share the same physics context, and the instances of the physics engines 234 on those disparate devices 106 may be synchronized to provide this unified context. This allows users at different locations to control the same context rendered on the disparate devices 106.

Energy agents can be programmatic or user defined for a given context and/or one or more of its objects. The energy agents may affect the kinematics of the physics of an object in the physics engine 234. A given energy agent may be added to a rendered context, and the context may inform the agent to act on the context based on one or more triggering criteria (e.g., events, random or systematic timers, predetermined criterion, etc.). For example, using JavaScript, a developer could add one or more energy agent objects to a context (e.g., a <div> container) that define the virtual physical attributes of the environment.

Render agents may also be added to objects to add cosmetic effects to objects. Render agents are agents that can affect the rendering and/or display of the objects. For example, a pulse effect embodying a render agent may be producing using the following example code:
  var myEffect=new PulseEffect({duration: 500});
  var anotherEffect=new Transform(FM.rotateZ(0.1));
  var someRenderable=new FamousSurface([300, 200], 'Just an Example',
    ['exampleClass', 'anotherClass']);
  mainCtx.contentFrom(myEffect).from(anotherEffect).from(someRenderable);

When added, energy agent objects may be associated with one or more instances of the physics engine 234, and the context may be configured to inform the energy agent objects to have their effects applied based on predetermined triggers. In some implementations, the performance framework 116 can signal the rendering engine 230 to notify the affected surfaces when a certain triggering criterion occurs, and the surfaces can then signal the associated instances of the physics engine 234 to process the energy agents that are also associated with the surfaces. The context may also provide to any associated instances of the physics engine 234 other information about context, such as its attributes (e.g., opacity, position, etc.) and/or the attributes of the objects associated with the context, such as its children elements. In further implementations, the physics engine 234 may obtain any information about the context and/or its associated elements from an API of the software application 260, such as a Document Object Model (DOM).

Energy agents can use one or more events as inputs when being processed by the physics engine 234. For instance, a given energy agent may represent the act to be performed when a certain gesture input by a user is received, and or may vary based on the attributes (e.g., velocity, position, etc.) of the input. Example energy agents may include a velocity energy agent that applies movement to a surface or set of surfaces when scrolled or panned, tracking energy agent that applies a tracking movement to a surface or set of surfaces when the user moves the controlling input (e.g., finger, hand, etc.) around the control region (e.g., touch sensitive surface), etc.

As a further example, the physics engine 234 may receive the velocity and position associated with an event that corresponds to a given surface/rendered context. From the surface, the physics engine 234 can compute the effect of the event on the surface relative to the other energy agent constraints that are associated with that surface. For instance, each time a finger presses and holds down on a surface displayed via the touch sensitive display device 214, and the surface has a tracking energy agent that says the surface should track the movement of the finger, the physics engine 234 computes the tracking effect the tracking energy agent has on the surface relative to any other constraints that may also govern the surface, such as boundary limitations, friction, drag, bounce back, etc. As the finger moves around the screen, the physics engine 234 is informed of the velocity and position of the finger and updates the surface with this movement based on the vector(s) associated with the tracking energy agent and relative to the other forces that are applicable to the surface. When the finger is removed from the screen, the input engine 232 ceases to provide events (e.g., touch vectors) to the physics engine 234 for that surface, and the physics engine 234 is thus informed that the surface is no longer being controlled by the input. At this point, the physics engine 234 allows the other energy agents associated with the surface to transition in and bring the surface to a steady state (which could be a static or dynamic state).

It should be understood that energy agents can, in some cases, act independently of input events. Stated differently, an agent might or might not respond to an input, but has an output, which can affect the state of an object. For instance, there can be certain energy agents added to a rendered context that define the environment of the context. As an example, a rotational energy agent may be added to a viewport to slowly rotate the objects (e.g., DOM elements) of the viewport about a center point at a predetermined rate, and after items are spun using a swipe by the user, the spinning motion may eventually returns back to that base rotational state and rate. In another example, a scroll view may include several scrollable elements. The scroll view may have two agents associated with it—a velocity agent and a drag agent. The velocity agent allows the elements to be scrolled quickly based on repeated, rapid user inputs, and the drag agent slows down the scrolling to give it a slowing effect between inputs. As a further example, suppose a user would like to move a few objects (e.g., DOM elements) in a viewport together and basically uses a grab gesture to tosses them into a pile in the viewport. The objects may have a sticky energy agent that adheres the objects together in the pile, and may have a gravity energy agent that opposes the sticky energy agent, causing some of the objects to unstick and fall. Additionally or alternatively, the viewport may have a vortex energy agent that causes all objects (e.g., DOM elements) to rotate around a center point when at steady state.

The physics engine 234 is capable of computing the dynamic state of a context over time. The physics engine 234 can determine how an object (e.g., a surface, etc.) of a context will be affected by events, energy agents, and transitions associated with that context, and can output data describing these effects to the surface translation engine 236, which can encapsulate these effects in a scene graph and output the scene graph to the rendering engine 230 for rendering and display to the user. In some implementations, the data output by the physics engine 234 can describe the energy agents at least in terms of transformation matrices describing how the corresponding object(s) are to be visually affected (e.g., transformed).

The surface translation engine 236 includes software and/or logic for applying translations and/or other visual effects to data reflecting object(s) associated with a renderable context (e.g., viewport) based on inputs, events, and/or transitions, and then feeds the data to the rendering engine 230 and GPU for rendering and display. The surface translation engine 236 may be coupled to the physics engine 234 and/or the input engine 232 to receive surface-related information, such as corresponding input events, energy agent-related/transformation information, and transitions. The surface translation engine 236 may translate the objects based on the transformation information. In some implementations, the surface translation engine 236 may apply the translations and/or other visual effects to surface(s) based on the processed events received from the input engine 232, the processed events being associated with the surface(s). In some implementations, the physics engine 234 may output position and velocity information associated with an object, which the surface translation engine 236 may then use to apply the corresponding translation. By way of example, the following code may be used by the surface translation engine 236 to receive and apply transformation information from the physic engine 234:

```
function getCurrentTransform( ) {
    var position = physicsEngine.getPosition( );
    var velocity = physicsEngine.getVelocity( );
    return Matrix.move(Matrix.skew(velocity, 0, 0), [position, 0, 0]);
}
```

The above code may produce the transform for a moving object that skews more the faster it moves.

In some implementations, the surface translation engine 236 may apply the translations and/or other visual effects by generating and manipulating a scene graph. A scene graph includes a data structure including nodes that describe the renderable content in the form of a tree structure, in which a parent node contains one or more children nodes, and the children nodes may further constitute parent nodes relative to the children nodes they contain, and so one and so forth. Each node of the scene graph may include positional, rotational, scaling, and/or geometrical information, etc., associated with that node, and may include such information in multiple dimensions (e.g., 2D, 3D, etc.), although it should be understood that any other attributes may also be included, such as opacity.

Below is an example scene graph generated by the surface translation engine 236 for a translucent surface placed next to another surface and the surfaces being rotated together:

```
[
    {
        transform: [1, 0, 0, 0, 0, 1, 0, 0, 0, 0, 1, 0, -100, 0, 0, 1],
        opacity: 0.5,
        target: 3
    },
    {
        transform: [0.707, -0.707, 0, 0, 0.707, 0.707, 0, 0, 0, 0, 1, 0, 0, 0, 0, 1],
        target: [
            4,
            {
                transform: [1, 0, 0, 0, 0, 1, 0, 0, 0, 0, 1, 0, 100, 0, 0, 1]
                target: 5
            }
        ]
    }
]
```

In the above example, the transformation matrices, in order, are: translate(−100, 0, 0), rotateZ(PI/4), and translate (100, 0, 0), which apply to entities (surfaces) with respective ids of 3, 4, and 5, where 3 is positioned 100 pixels to the left of the PI/4-radian rotation of 4 and 5, and 5 is positioned 100 pixels to the right of 4.

In some web browser-based implementations, the surface translation engine 236 may generate the scene graph by progressively applying the transforms beginning with the leaves and ending with the roots, and the rendering engine 230 may apply the scene graph to the DOM in reverse order.

When generating the scene graph, the surface translation engine 236 can format the data received from the physics engine 234 and/or the input engine 232, such as data describing applicable events, energy agent effects, and/or transitions, into a scene-graph compatible format and incorporate it. For instance, a change in position, rotation, scale, and/or geometry, etc., due to one or more energy agents may be calculated (e.g., as vectors) by the physics engine 234 and provided to the surface translation engine 236, which may reflect these changes in the node. The surface translation engine 236 may receive information about the rendered context and the one or more objects included therein, such as current position, rotation, scale, geometry, etc., from the rendering engine 230 (e.g., a DOM) and incorporate it into the scene graph. In some implementations, a location matrix can be computed based on scene graph data. The physics engine 326 may be used as a source to compute the location matrix, and the surface translation engine 236 may then apply this location matrix to one or more elements of a rendered context for translation.

The surface translation engine 236 may generate its own distinct scene graph, which it can then provide to the rendering engine 230. The rendering engine 230 can use GPU accelerated rendering to process the scene graph and produce the surface translations and/or other effects in the viewport (e.g., browser window) without having to substantially reprocess the scene graph. This can yield significant performance improvements and eliminate unwanted visual artifacts when rendering objects, for example, in a web browser context. In some cases, the nodes of the scene graph are not directly associated with the items being visually displayed, but are rather representations of those items and can be independently transformed by the surface translation engine 236. This can allow the performance framework 116 to be over a magnitude more efficient than when the elements are directly associated with the items being visually displayed and the transformations are processed by the rendering engine 230 itself.

In some implementations, the rendering engine 230 may signal the surface translation engine 236 to output a scene graph (e.g., based on the occurrence of one or more events) for a given renderable context. In some implementations, the surface translation engine 236 may provide the scene graph to the rendering engine 230 responsive to receiving information and/or input events from the physics engine 234 and/or the input engine 232. Other variations are also contemplated.

The APIs 240 include software and/or logic for interfacing with and providing the acts, functionality, etc., of the performance framework 116, and/or its constituent components to another software applications, such as the software application 260, the applications 114a . . . 114n, etc. In some implementations, the APIs 240 relays requests and responses from the other software application to the appropriate components of the performance framework 116 for processing. For example, in an implementation where the application 114 and the performance framework 116 reside on distinct computing devices coupled via the network 102, the application 114 may interface with the performance framework 116 via the APIs 240. The APIs 240 may be electronically communicatively coupled to the other components of the performance framework 116 to relay information. For example, in a multi-view implementation where the same physics context is shared via two or more rendered contexts on disparate computing devices, the APIs 240 can receive inputs via the network 102 and the network interface 208, from a remote instance of the performance framework 116, and provide the inputs to a local instance of the input engine 232 for processing and synchronization. The APIs 240 may also provide access to data stored on the computing device.

In some implementations, the APIs 240 may require an interfacing software application to authenticate using a standard authentication protocol to utilize its functionality.

Additional structure, acts, and/or functionality of the one or more components of the client application 108, the software application 260, and/or the performance framework 116 including the rendering engine 230, the interaction engine 238, the input engine 232, the physics engine 234, the surface translation engine 236, and/or the APIs 240 are further discussed elsewhere herein.

Figure 3:
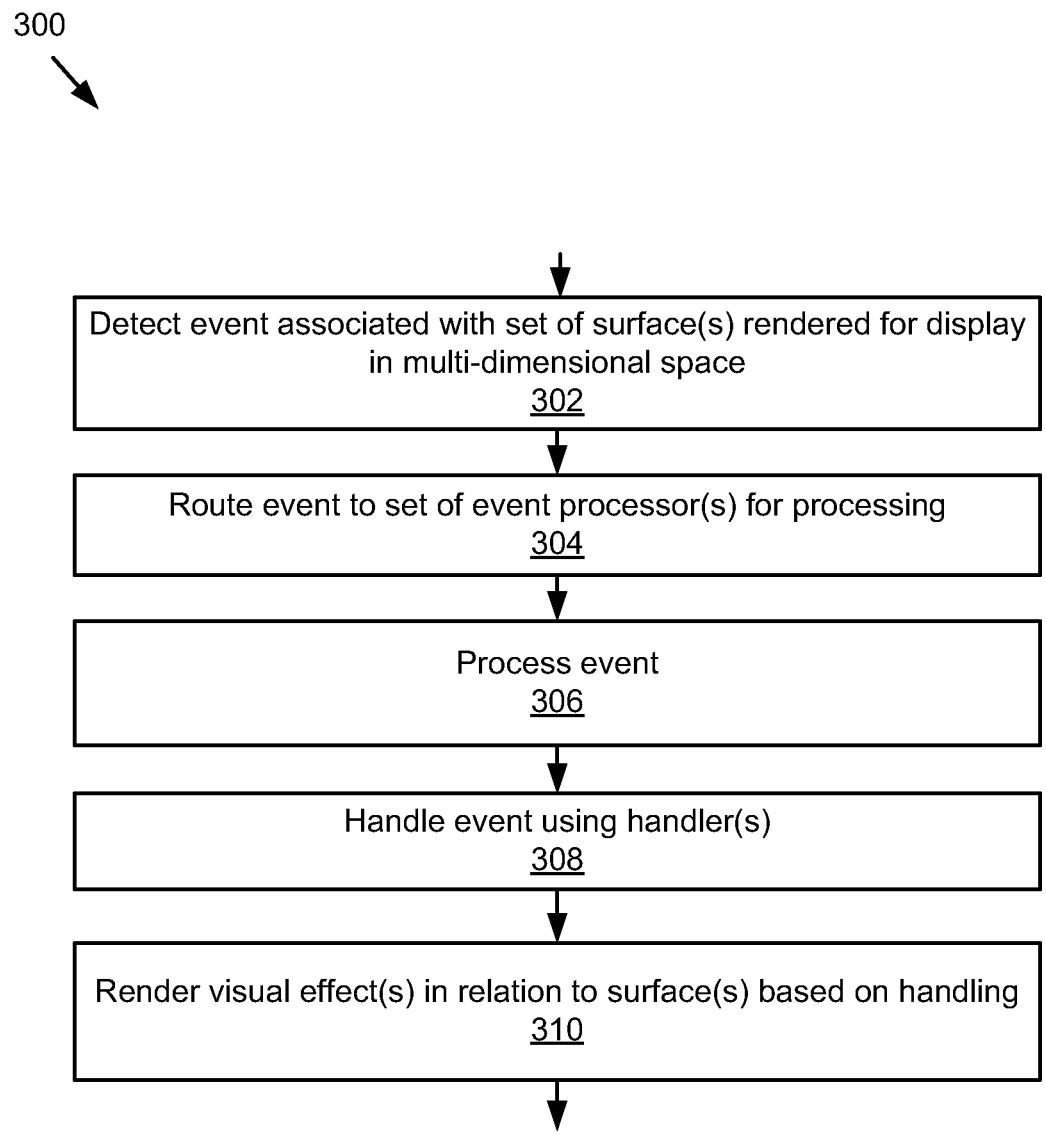
FIG. 3 is a flowchart of an example method for expediting the processing and handling of the events.

FIG. 3 is a flowchart of an example method for expediting the processing and handling of the events. The method 300 may begin by detecting 302 an event. The event may reflect an action taken by a user relative to a set of one or more surfaces that are rendered for display to the user in a multi-dimensional space (e.g., 2D, 3D, etc.). Non-limiting examples of the event may include a touch event, a mouse pointer event, a keyboard event, a motion gesture event, etc. The method 300 may route 304 the event to a set of one or more event processors 248 for processing. In some instances, the operation in block 304 may be performed by the event routing module 246 as described elsewhere herein.

The method 300 may then process 306 the event upon receiving. For instance, an event processor 248 of the set may receive the event from the event routing module 248, process the event, may further send to another event processor 248 in the set for further processing, and so on and so forth. Once the event is processed by the one or more event processors 248 of the set, the method 300 may handle 308 the event using one or more event handlers 250. The one or more event handlers 250 may perform their respective handling operations on the event as described elsewhere herein. The method 300 may then render 310 one or more visual effects in relation to the one or more surfaces of the set based on the handling performed by the one or more event handlers 250. In some instances, the surface translation engine 236 may generate a scene graph describing how to render the one or more visual effects based on the handling, and the rendering engine 230 may, in cooperation with the GPU, apply the one or more visual effects to the one or more surfaces using the scene graph.

Figure 4A:
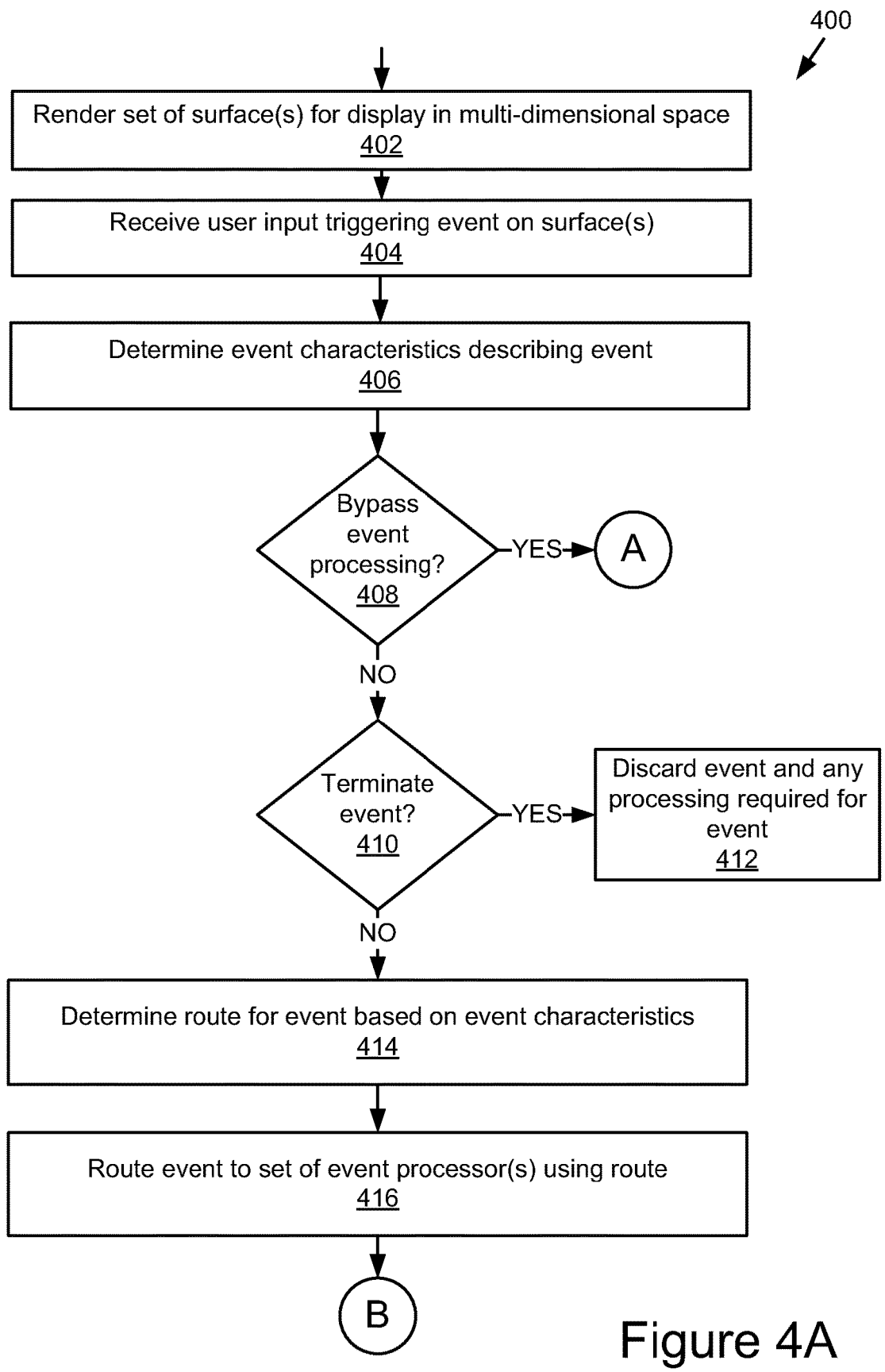
FIGS. 4A and 4B are flowcharts of a further example method for expediting the processing and handling of the events.
Figure 4B:
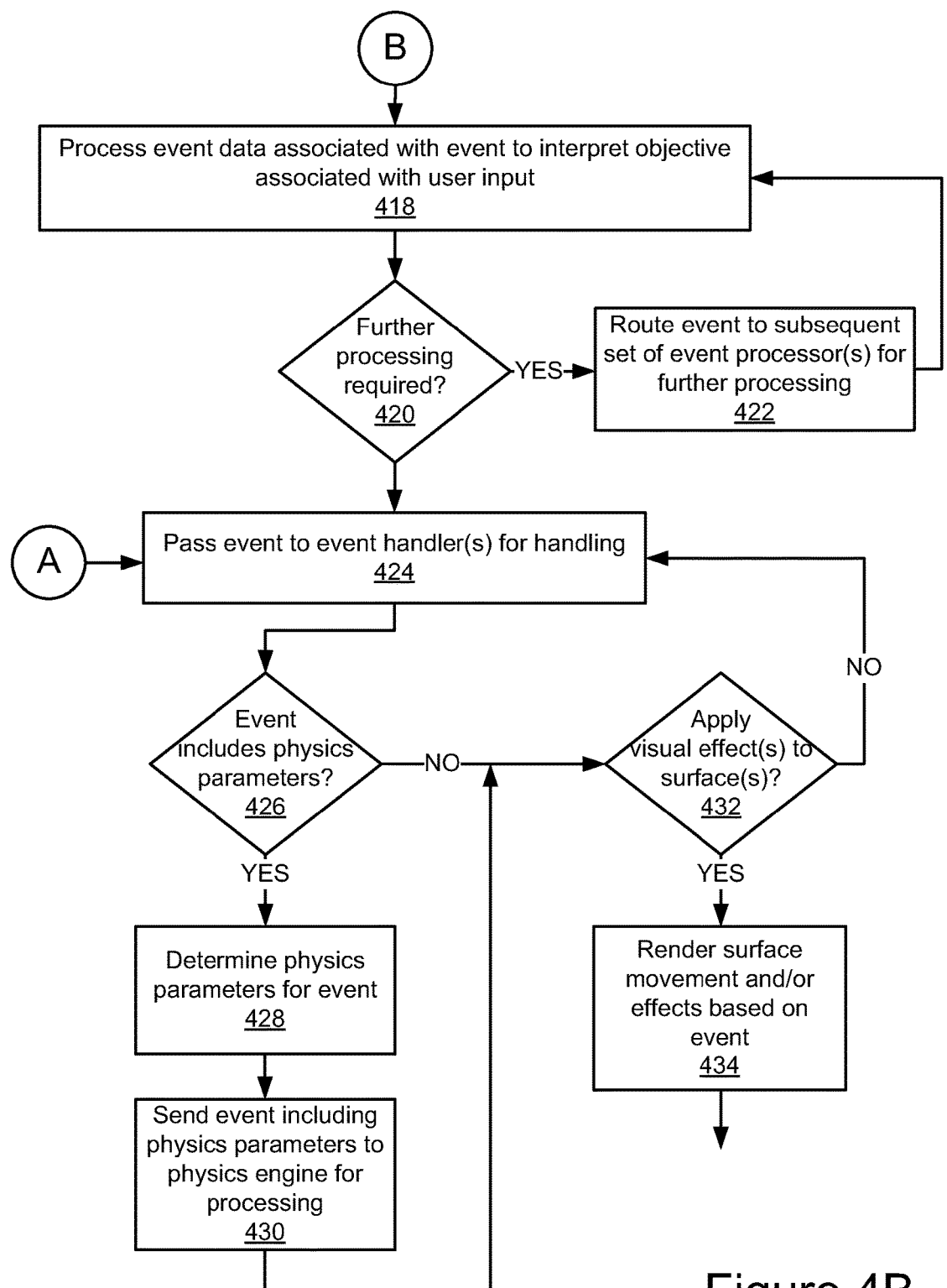

FIGS. 4A and 4B is a flowchart of another example method 400 for expediting the processing and handling of the events. The method 400 may begin by rendering 402, via a web browser, a set of one or more surfaces for display in a multi-dimensional space. For example, the rendering engine 230 may render the one or more surfaces of a web page in 3D space. In some instances, the one or more surfaces may correspond to one or more of DOM elements, HTML elements, etc. The method 400 may continue by receiving 404 an input from a user, the input triggering an event on the one or more surfaces of the set rendered for display in block 402. The method 400 may determine 406 event characteristics associated with the event. The event characteristics may describe one or more properties (e.g., direction, position, force, velocity, etc.) that are associated with the event and help to decide whether the objective that the user is trying to achieve by providing the input is clear based on those properties.

The method 400 may then determine in block 408 whether to bypass event processing by event processors 248 based on the event characteristics. In some instances, the method 400 may make this determination based on whether the event meets one or more pre-determined processing criteria based on the characteristics associated with the event. If the result of the determination in block 408 is affirmative, then the method 400 may proceed to block 424 (see FIG. 4B) to pass the event directly to one or more event handlers 250 for handling, as further described below. If on the other hand, the result of the determination in block 408 is negative, then the method 400 may determine in block 410 whether to terminate the event. For example, the event routing module 248 may decide upon determining the event characteristics of the event that the event is not a useful event and is not worth processing. If the result of the determination in block 410 is affirmative, then the method 400 may discard 412 the event and any processing that is required for the event. Otherwise, the method 400 may proceed to block 414 to determine 414 a route for the event based on the event characteristics associated with the event and then route 416 the event to a set of one or more event processors 248 for processing using the route as depicted for example in FIG. 5. In some instances, the operations in the block 414 and 416 may be performed by the event routing module 246 as described elsewhere herein.

Upon routing the event to the set of one or more processors 248 for processing, the method 400 may then process 418 event data associated with that event to interpret an objective associated with the user input received in block 404. The event data may include one or more characteristics or properties associated with the event as discussed elsewhere herein. In some implementations, the event may be routed from one event processor to another event processor of the set for processing until the objective is clearly interpreted and the event is ready for handling. In some cases, an input received in block 404 may trigger a low-level event (e.g., event with the unknown or unclear objective) (e.g., including raw data) and the low-level event may be converted into a high-level event (e.g., event with known and clear objective) (e.g., including renderable data processed from the raw data) based on the processing performed by the set of one or more event processors 248.

Upon processing the event data, the method 400 may then determine in block 420 whether further processing is still required for the event. In some implementations, the method 400 may perform this determination based on whether the event as processed by the set of one or more event processors 248 is identified into one particular event (e.g., a flick) or a series of closely related events (e.g., flick, swipe, scroll, etc.). If the determination in block 420 is affirmative, then the method 400 may route 422 the event to a subsequent set of one or more event processors for further processing. The subsequent set of one or more event processors may then perform the same operations as discussed above with respect to block 418 until the event objective is clearly known and no further processing is required for the event.

Once the method 400 determines that no further processing is required for the event in block 420, the method 400 may then pass 424 the event to one or more event handlers 250 for handling. In some instances, the method 400 may use an algorithm to choose the one or more event handlers 250 appropriate for handling the event. In other instances, the method 400 may choose the one or more event handlers 250 randomly and pass the event to those handlers 250. Other variations are also possible and contemplated.

The one or more event handlers 250 upon receiving the event may determine in block 426 whether the event includes any physics parameters that need processing. If the result of the determination in block 426 is affirmative, then the one or more event handlers 250 may determine 428 one or more physics parameters for the event and then send 430 the event including the one or more physics parameters to a physics engine 234 for further processing. The physics engine 234 may then perform its respective operation on the event as described elsewhere herein. Once the physics engine 234 is done performing its operation on the event, the method 400 may proceed to block 432 to perform next set of operations as discussed below.

If on the other end, the determination in block 426 is negative, then the one or more event handlers 250 may proceed to block 432 to determine whether to apply one or more visual effects to the one or more surfaces of the set that are associated with the event. If the determination in the block 432 is affirmative, then the method 400 may render 434 surface movement and/or effects based on the event. For example, the one or more event handlers 250 may send the event processed by event processors 248 to the surface translation engine 236, which may then use the processed event to generate a scene graph. The scene graph may include transition and/or movement information based on the processed event. The surface translation engine 236 may send the scene graph to the rendering engine 230, which may then use it to render the one or more visual effects in relation to the one or more surfaces. If on the other hand, the result of the determination in block 432 is negative, then the method 400 may return to receive another event for handling.

Figure 5:
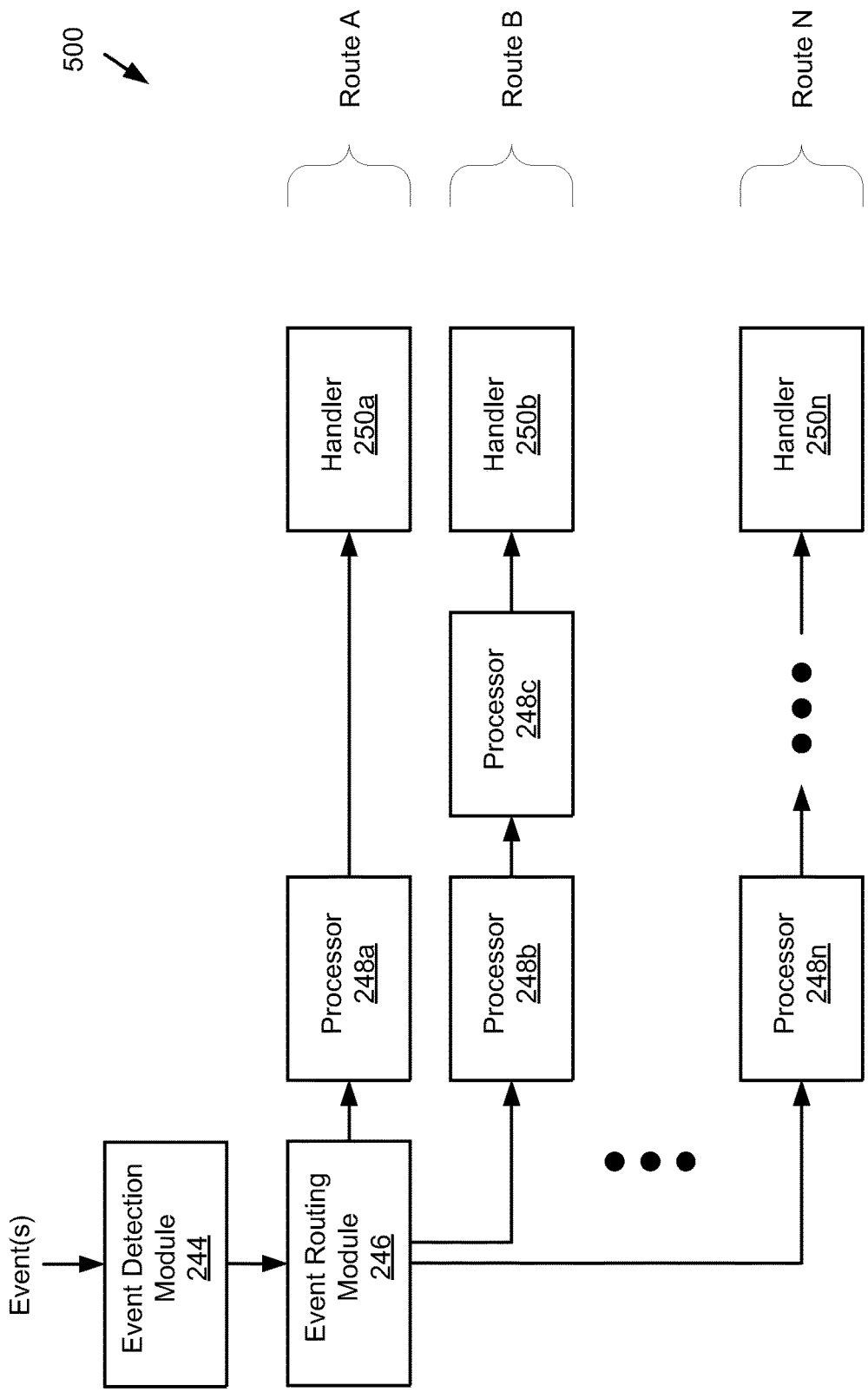
FIG. 5 is a graphical representation of an example data flow diagram depicting how one or more events are routed for processing and handling.

FIG. 5 is a graphical representation of an example data flow diagram 500 depicting how one or more events are routed for processing and handling. As depicted, the event detection module 244 detects the one or more events. These events may be received on surfaces that are rendered for display to a user. In some implementations, the interaction engine 238 may receive one or more inputs from the user via the input devices 216 and/or the touch sensitive display device 214 and the event detection module 244 may detect the one or more events based on the one or more inputs triggering those events. Upon detecting the one or more events, the event detection module 244 may pass the events to the event routing module 246 of the input engine 232.

The event routing module 246 may determine for each event, one or more characteristics associated with that event. Determining characteristics for an event is advantageous as it may help the event routine module 246 to appropriately determine whether processing is needed for the event and if needed which event processor 248 to route the event to that is suitable to process the event with those characteristics. In some cases, the event routing module 246 may determine that no processing is required for an event based on the event characteristics and may simply route the event to one or more event handlers 250 for handling as discussed elsewhere herein.

Once a suitable event processor 248 is determined to process an event, the event routine module 246 may then determine a route for routing the event to that processor. Similarly, the event routing module 246 may determine routes for any other events. The event routing module 246 may then use one or more routes determined by it to route the one or more events to the one or more event processors 248a . . . n for processing. The event processors 248a . . . 248n may process the one or more events. In some instances, an event processor 248 upon processing an event may pass the event to another event processor for further processing, as discussed elsewhere herein. For example, as depicted in the figure, the event processor 248b may send an event to processor 248c for further processing. This processing is generally compact for efficiency but may iterate as long as the necessary to clearly interpret the objective associated with the event, as discussed elsewhere herein.

Once an event is processed by an event processor 248, the event processor 248 may then pass the processed event to an event handler 250 for handling. For example, as depicted in the figure, the event processor 248a may pass the processed event to handler 250a for handling, the event processor 248c may pass the processed event to handler 250b for handling, the event processor 248n may pass the processed event to handler 250n for handling, so on and so forth. Upon receiving a processed event, the event handler 250 may determine whether to compute physics for the event and/or apply visual effect(s) to surface(s) associated with the processed event as described elsewhere herein. In some cases, the event handler 250 can also determine for an event whether further processing is still required for the event. If the event handler 250 determines that the further processing is required, the event handler 250 may then determine a route for passing the event to an appropriate event processor 248 for further processing. For example, as depicted in the figure, the event handler 250a may determine a route A, the event handler 250b may determine a route B, the event handler 250c may determine a route N, so on and so forth.

FIG. 6 is a graphical representation of an example user interface 600 depicting handling and processing of events when applied to DOM elements. The interface 600 depicts two paths for defining a paragraph tag in an HTML document. Path 602 represents defining the paragraph tag using a standard, inefficient approach. Path 604 represents defining the paragraph tag using the efficient technology described in this disclosure. As depicted, using the standard approach 602, a body tag is needed to be defined along with 2 div containers for incorporating the paragraph (e.g., <p> text) and level 1 heading (e.g., <h1> text) respectively. On the other hand as depicted by path 604, using the technology described in this disclosure, the paragraph tag <p> can be directly defined without needing to declare a body tag (<body>) and a div container as required in the traditional approach 602. This is advantageous as it eliminates any additional time and lag that may be introduced upon defining the tag using the traditional approach.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   detecting, using one or more computing devices, a first event associated with a set of one or more surfaces rendered for display via a web browser in a multi-dimensional space;
   determining, using the one or more computing devices, event characteristics describing an input that triggers the first event associated with the one or more surfaces of the set;
   determining, based on the determined event characteristics, a route by at least determining a number of event processors to be included in the route, determining a type for each of the event processors to be included in the route, and determining a sequence for the event processors to be included in the route, the event processors forming a first set of event processors;

routing, using the one or more computing devices, the first event to the first set of event processors for processing via the web browser using the determined route that bypasses a standard path defined by a document object model for event processing;

processing the first event using the one or more computing devices and the first set of event processors; and after the processing, handling the first event using the one or more computing devices and one or more first event handlers.

2. The computer-implemented method of claim 1, wherein processing the first event includes processing event data associated with the first event to interpret an objective associated with the input provided by a user.

3. The computer-implemented method of claim 1, further comprising:

after the processing by the first set of event processors, determining, using the one or more computing devices, whether further processing is required for the first event; and responsive to determining that the further processing is required, routing, using the one or more computing devices, the first event to a second set of one or more event processors for the further processing.

4. The computer-implemented method of claim 1, wherein handling the first event includes:

determining, using the one or more computing devices, one or more physics parameters for the first event; and translating, using the one or more computing devices, the one or more surfaces of the set associated with the first event based on the one or more physics parameters.

5. The computer-implemented method of claim 1, further comprising:

detecting, using the one or more computing devices, a second event associated with the set of one or more surfaces rendered for display via the web browser in the multi-dimensional space;

determining, using the one or more computing devices, the second event to meet a predetermined processing criterion; and handling the second event using the one or more computing devices and one or more second event handlers without previously processing the second event using event processors.

6. The computer-implemented method of claim 1, further comprising:

rendering, using the one or more computing devices, one or more visual effects in relation to the one or more surfaces of the set based on the handling.

7. The computer-implemented method of claim 1, wherein the first event includes one of a touch event, a mouse pointer event, a keyboard event, and a motion gesture event.

8. The computer-implemented method of claim 1, wherein the one or more surfaces correspond to one or more DOM elements that are rendered for display via the web browser.

9. A computer program product comprising a computer usable medium including a computer readable program, wherein the computer readable program when executed on a computer causes the computer to:

detect a first event associated with a set of one or more surfaces rendered for display via a web browser in a multi-dimensional space;

determine, using the one or more computing devices, event characteristics describing an input that triggers the first event associated with the set of one or more surfaces;

determine, based on the determined event characteristics, a route by at least determining a number of event processors to be included in the route, determining a type for each of the event processors to be included in the route, and determining a sequence for the event processors to be included in the route, the event processors forming a first set of event processors;

route the first event to the first set of event processors for processing via the web browser using the determined route that bypasses a standard path defined by a document object model for event processing;

process the first event using the first set of event processors; and handle the first event using one or more first event handlers after the processing.

10. The computer program product of claim 9, wherein to process the first event includes processing event data associated with the first event to interpret an objective associated with the input provided by a user.

11. The computer program product of claim 9, wherein the computer readable program, when executed on the computer, further causes the computer to:

determine whether further processing is required for the first event after the processing by the first set of event processors; and route the first event to a second set of one or more event processors for the further processing responsive to determining that the further processing is required.

12. The computer program product of claim 9, wherein to handle the first event includes:

determining one or more physics parameters for the first event; and translating the one or more surfaces of the set associated with the first event based on the one or more physics parameters.

13. The computer program product of claim 9, wherein the computer readable program, when executed on the computer, further causes the computer to:

detect a second event associated with the set of one or more surfaces rendered for display via the web browser in the multi-dimensional space;

determine the second event to meet a predetermined processing criterion; and handle the second event using one or more second event handlers without previously processing the second event using event processors.

14. The computer program product of claim 9, wherein the computer readable program, when executed on the computer, further causes the computer to:

render one or more visual effects in relation to the one or more surfaces of the set based on handling.

15. The computer program product of claim 9, wherein the first event includes one of a touch event, a mouse pointer event, a keyboard event, and a motion gesture event.

16. The computer program product of claim 9, wherein the one or more surfaces correspond to one or more DOM elements that are rendered for display via the web browser.

17. A system comprising:

one or more processors; and one or more memories storing instructions that, when executed by the one or more processors, cause the system to:

detect a first event associated with a set of one or more surfaces rendered for display via a web browser in a multi-dimensional space;

determine, using the one or more computing devices, event characteristics describing an input that triggers the first event associated with the one or more surfaces of the set;

determine, based on the determined event characteristics, a route by at least determining a number of event processors to be included in the route, determining a type for each of the event processors to be included in the route, and determining a sequence for the event processors to be included in the route, the event processors forming a first set of event processors;

route the first event to the first set of event processors for processing via the web browser using the determined route that bypasses a standard path defined by a document object model for event processing;

process the first event using the first set of event processors; and handle the first event using one or more first event handlers after the processing.

18. The system of claim 17, wherein to process the first event includes processing event data associated with the first event to interpret an objective associated with the input provided by a user.

19. The system of claim 17, wherein the instructions, when executed by the one or more processors, further cause the system to:

determine whether further processing is required for the first event after the processing by the first set of event processors; and route the first event to a second set of one or more event processors for the further processing responsive to determining that the further processing is required.

20. The system of claim 17, wherein to handle the first event includes:

determining one or more physics parameters for the first event; and translating the one or more surfaces of the set associated with the first event based on the one or more physics parameters.

21. The system of claim 17, wherein the instructions, when executed by the one or more processors, further cause the system to:

detect a second event associated with the set of one or more surfaces rendered for display via the web browser in the multi-dimensional space;

determine the second event to meet a predetermined processing criterion; and handle the second event using one or more second event handlers without previously processing the second event using event processors.

22. The system of claim 17, wherein the instructions, when executed by the one or more processors, further cause the system to:

render one or more visual effects in relation to the one or more surfaces of the set based on handling.

23. The system of claim 17, wherein first event includes one of a touch event, a mouse pointer event, a keyboard event, and a motion gesture event.

24. The system of claim 17, wherein the one or more surfaces correspond to one or more DOM elements that are rendered for display via the web browser.

25. A system comprising:

means for detecting a first event associated with a set of one or more surfaces rendered for display via a web browser in a multi-dimensional space;

means for determining, using the one or more computing devices, event characteristics describing an input that triggers the first event associated with the one or more surfaces of the set;

means for determining, based on the determined event characteristics, a route by at least determining a number of event processors to be included in the route, determining a type for each of the event processors to be included in the route, and determining a sequence for the event processors to be included in the route, the event processors forming a first set of event processors;

means for routing the first event to the first set of event processors for processing via the web browser using the determined route that bypasses a standard path defined by a document object model for event processing;

means for processing the first event using the first set of event processors; and means for handling the first event using one or more first event handlers after the processing.

26. The method of claim 1, wherein the web browser, via which the one or more surfaces are rendered for display and via which the first event is routed to the first set of event processors for processing, is the same web browser.

* * * * *